Oct. 12, 1943.  E. H. MOSHER  2,331,340
VEHICLE SAFETY DOOR CONSTRUCTION
Filed March 9, 1940
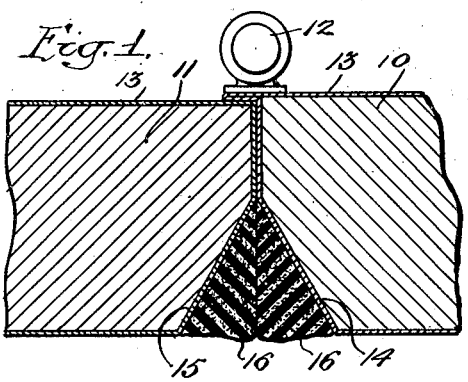
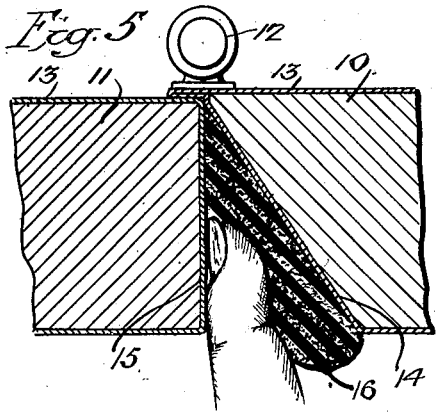
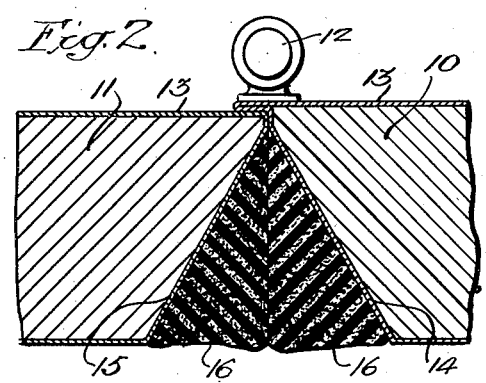
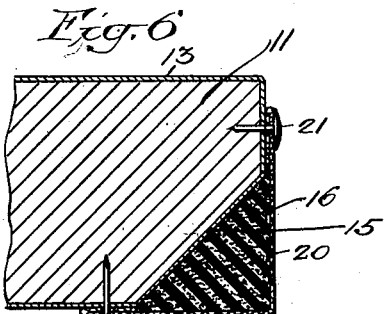
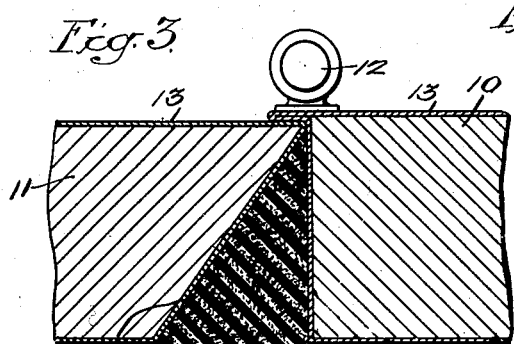
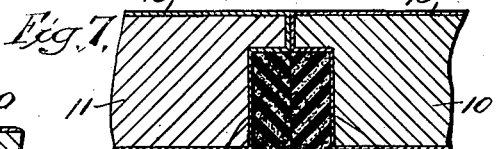
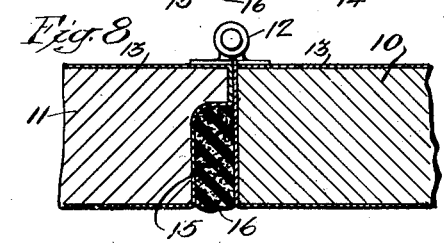
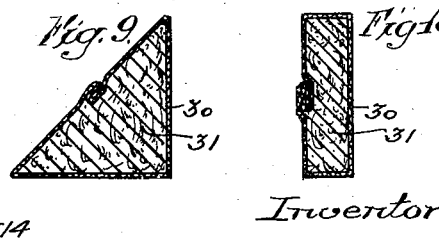
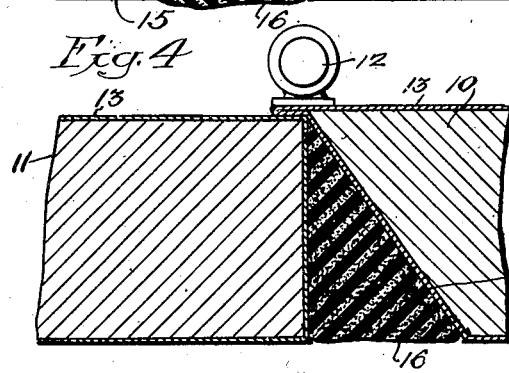
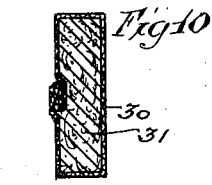
Inventor
Ellsworth H. Mosher Patented Oct. 12, 1943

2,331,340

UNITED STATES PATENT OFFICE 2,331,340

VEHICLE SAFETY DOOR CONSTRUCTION

Ellsworth H. Mosher, Merion, Pa.

Application March 9, 1940, Serial No. 323,142

5 Claims. (Cl. 20—16)

This invention pertains generally to the art of vehicle door construction.

The invention pertains particularly to a vehicle door and means associated therewith for preventing injury to occupants of the vehicle.

The invention pertains more particularly to means associated with a vehicle door such as an automobile door for greatly minimizing the chances of injury resulting when such a door is accidently "slammed shut" upon the fingers of an occupant of the vehicle.

As is well known, the mashing of fingers resulting from the accidental slamming of automobile doors is of fairly frequent occurrence. Mishaps of this kind, while seldom serious or fatal, generally cause painful bruising or crushing of the finger or fingers, which may in some instances require amputation of a portion thereof.

It is an object of my invention, accordingly, to modify a vehicle door construction in such a manner that the unfortunate consequences of accidents of the type mentioned will be substantially or entirely eliminated.

It is a further object of the invention to provide a modified vehicular door construction which will at the same time be relatively inexpensive to manufacture and apply—an important commercial consideration, particularly with respect to its use in vehicles in the lower price fields.

It is a still further object of the invention to provide such a construction which may readily be made to harmonize completely with the appointments of any vehicle—however luxurious they might be.

The manner in which these and other objects of the invention are achieved will become apparent to those skilled in the art upon becoming familiar with the description which follows.

My invention, broadly speaking, comprises the bevelling or recessing of the inner edge of the door frame of the vehicle, or the inner edge of the door itself, or the inner edge of both these elements. The space or cavity thus provided at the juncture between the vehicle body and the vehicle door preferably substantially filled with a relatively soft, yielding material in such a manner as to permit the finger or fingers of an occupant of the vehicle to be readily accommodated with space to spare. In this manner, instead of being mashed or crushed as sometimes happens with present door construction, the fingers caught by the slamming door are merely pinched, more or less gently, depending upon the nature and arrangement of the packing material forming part of my preferred construction.

My invention, being thus described in general terms, preferred embodiments thereof may be more particularly described in connection with the accompanying drawing, in which:

Figure 1 is a partial horizontal cross-section through a portion of a vehicle door and its associated door-frame showing the invention applied thereto;

Figures 2, 3 and 4 are similar views showing modified arrangements according to the invention;

Figure 5 is a view showing how such a construction prevents injury to one's finger when a vehicle door of which it is a part is inadvertently slammed thereon;

Figure 6 is a partial sectional view showing further details of construction;

Figures 7 and 8 are views similar to Figures 2 and 3, respectively, but showing further slight changes in construction; and Figures 9 and 10 are sectional views of cushioning strips that might be employed in the door construction according to the invention.

As shown in Figure 1, car door 10 is mounted in the usual cooperative relation with car body 11 by means such as exterior hinge 12, as is conventional practice in automobile body construction. The door and body may be of wood covered with sheet metal 13 as shown diagrammatically. Alternatively, these elements may be of the so-called "all-metal" construction. Any other desired construction may, of course, be employed.

The inner edges of car door 10 and/or car body 11 are bevelled or recessed, as indicated generally at 14 and 15 respectively. The space thus left between door and body preferably is substantially filled by a strip or strips of soft, yielding and/or resilient material 16, which strips preferably extend along the entire length of the door and/or frame—and particularly the portions thereof which have been found by experience as most likely to involve the fingers of an occupant in an accident. The insert strip preferably conforms substantially in shape and/or size with the recessed or hollowed-out space between the car door and body.

As shown in Figure 2, the construction is generally similar to that of Figure 1, but the bevelling or recessing is emphasized to a greater degree, extending substantially to the exterior edge of the car door and car body. The exact degree of recessing in any given case is of course immaterial, it being necessary only to take care that the space thereby left between the car door and car body is ample to safeguard the occupant's fingers, if caught therebetween.

Figures 3 and 4 are generally similar to Figure 2, each showing a modification in which only the car body or the car door (respectively) is recessed or bevelled in accordance with my invention.

Figure 5 is a view similar to Figure 4 graphically illustrating how my novel construction is adapted to protect the fingers of an occupant of the vehicle from severe injury in case said fingers are caught by a slammed door.

Fig. 6 is a view similar to Figure 3 illustrating one detailed method of applying my invention to vehicle doors. The soft yielding material in strip form may advantageously be formed of porous rubber-like material (e. g., sponge rubber). It may be held in assembled position on the door and/or frame by the aid of a suitable bonding agent (e. g., rubber cement). In addition, it may be covered and/or held in place by a covering strip 20 of fabric or other suitable material fastened to the metal and/or woodwork by screws, tacks, upholstery nails or the like elements 21, or by adhesive material, or otherwise. Besides serving to keep the yielding or resilient strip 16 firmly fastened in place, the covering material or holding strip 20 may be readily made to harmonize with any color scheme or the like which it may be desired to carry out with respect to the appointments (including the upholstery) of the vehicle. Complete artistic harmony with the colors and/or types of materials employed for the said appointments is thus assured.

Figures 7 and 8 are generally similar to Figures 2 and 3, respectively, differing therefrom only in that the protecting strips with the cooperating recesses into which they fit are substantially rectangular in cross-section instead of triangular. In certain cases such shape may be the preferred form, from the point of view of ease and/or economy in manufacture. With these modifications, as in any of the others, the degree of recessing (and consequently the size of the protecting strip) is not critical so long as it is in excess of the minimum required to safeguard the occupant's fingers, in accordance with the objects of the invention. A minimum space of for instance about 3/4" should be ample to safeguard the average person's fingers. In other words, the protecting strip illustrated for example in Figure 8 should not be less than about 3/4" thick to insure positive protection for the fingers.

While I have indicated sponge rubber as one preferred material for my protecting strip, any other soft, yielding and/or resilient material might likewise be employed, such as spongy rubbery-like masses of synthetic polymers of unsaturated hydrocarbons (e. g., isoprene) and their derivatives (e. g., "neoprene"), or the like.

For convenience, I employ the term "spongy rubber-like material" in the claims to embrace materials such as the foregoing, including sponge rubber itself.

On the other hand, a protecting strip which is in effect a plurality of strips such as of fabric filled or packed with a soft, yielding material (such as cotton, wool, felt, feathers, horsehair, or the like loosely arranged cushioning material) might be alternatively or additionally employed. The cloth or fabric strips may be held together as by sewing. In such case the assembly will be somewhat in the nature of an elongated cushion filled with said soft, yielding material, and of cross-section corresponding in shape substantially to any of the protecting strips 16 shown in Figures 1 to 8. Figures 9 and 10 illustrate this manner of fabricating the protective strips in triangular and rectangular shapes, respectively. One or more strips of cloth or fabric 30, of suitable texture and color, are formed into an elongated cushion and filled with cushioning material or filler 31 packed as tightly as may be desired. The protecting strip or cushion thus formed is ready for assembly.

The terms "yielding" and "resilient" are employed herein somewhat interchangeably to connote varying degrees of yieldingness and resilience, although it will be understood that the former property is essential if the primary objects of my invention are to be achieved. The latter property is highly desirable however since it insures retention of the original shape of my protecting strip.

The exact form or manner of bevelling or recessing the vehicle door and/or vehicle body which is illustrated need not be adhered to, it being possible to make the bounding surfaces of the recessed portions curved instead of substantially plane, without departing from the spirit of the invention. For convenience, in the claims I shall employ the term "recessing" (and variants thereof) to indicate generally the concept thus embraced by my invention.

The fabric cover 20 for the protective strip 16 (Figure 6) may be omitted provided the resilient strip 16 itself is otherwise securely fastened to the cooperating elements of the vehicle. Such secure fastening may be obtained by means such as by cement as heretofore indicated, or by nails or screws or otherwise as desired. However, an adhesive such as a suitable synthetic or natural resin dissolved in a volatile solvent (e. g., rubber cement) will generally be preferred rather than nails, screws, or the like, due to the possibility of injury to the fingers by contact with the latter.

While the invention is primarily intended for use on the "hinge" side of swinging vehicle doors wherein accidents of the type herein mentioned are most likely to occur, it nevertheless may be applied to any other type of door on any type of vehicle as well as to the entire inner periphery or edge of any door and/or associated doorframe, except of course the portion occupied by the door latch and its associated mechanism. A particularly practical manner of mounting the protective strips according to my invention which may be mentioned merely by way of illustration is to cause them to extend completely across the top of the door and/or door opening and down both sides thereof at least as far as the door latch on the latch side of the door and approximately six to twelve inches farther down on the hinge side of the door.

While by the construction according to the invention a relatively large space or cavity is formed between the car door and its associated door frame, it will be noted that there will be no inconvenience due to drafts since the protective strips inherently possess the added advantage of being excellent weather stripping material—particularly if so dimensioned that they will be placed under slight compression when the doors on which they are mounted are closed, as shown in various figures of the drawing.

It will be appreciated by those skilled in the art that the particular hinge construction (i. e., the exterior hinge 12) herein described might be replaced by any other equivalent construction (e. g., the concealed hinge construction now widely used in the automobile industry) without exceeding the scope of the invention.

It is to be understood that the foregoing description is given by way of illustration and that changes, omissions, additions, substitutions and/or modifications might be made within the scope of the claims without departing from the spirit of the invention.

I claim:

1. In combination with a passenger vehicle having a body element and a cooperative door element, means for preventing injury to the fingers of an occupant of said vehicle comprising a cavity in at least one of said elements and extending along the interior boundary between said body element and said door element and opening into the interior of said vehicle, said cavity at the interior side thereof being at least substantially as wide as a person's finger, and an insert of soft yielding material for and substantially filling said cavity; a portion of said body element and of said door element substantially abutting against each other on the exterior boundary between said body element and said door element.

2. A construction as in claim 1, wherein said said soft yielding material comprises spongy rubber-like material.

3. A construction as in claim 1, wherein said soft yielding material is covered at least in part by fabric-like material.

4. A construction as in claim 1, wherein said insert is so dimensioned as to be held under slight compression while the vehicle door is closed.

5. A construction as claim 1, wherein said soft yielding material comprises fiber-like material.

ELLSWORTH H. MOSHER.